July 1, 1941.  R. H. DAMON ET AL  2,247,480
INVENTORY CONTROL SYSTEM AND APPARATUS
Filed Nov. 6, 1939  9 Sheets-Sheet 2

Robert H. Damon
Clarence F. Rogier
John W. Baur
Thomas E. Kulo
INVENTORS.

BY Edmund W. E. Kumm
ATTORNEY.

Fig. 8

July 1, 1941.    R. H. DAMON ET AL    2,247,480
INVENTORY CONTROL SYSTEM AND APPARATUS
Filed Nov. 6, 1939    9 Sheets-Sheet 4

Robert H. Damon
Clarence F. Rogier
John W. Baur
Thomas E. Kulo
INVENTORS

BY Edmund W. E. Kamm

ATTORNEY.

Robert H. Damon
Clarence F. Rogier
John W. Baur
Thomas E. Kulo
INVENTORS.

BY Edmund W. E. Kamm
ATTORNEY.

July 1, 1941. R. H. DAMON ET AL 2,247,480
INVENTORY CONTROL SYSTEM AND APPARATUS
Filed Nov. 6, 1939 9 Sheets-Sheet 8

Robert H. Damon
Clarence F. Rogier
John W. Baur
Thomas E. Kulo
INVENTORS.

BY Edmund W. E. Kamm
ATTORNEY.

July 1, 1941.   R. H. DAMON ET AL   2,247,480
INVENTORY CONTROL SYSTEM AND APPARATUS
Filed Nov. 6, 1939   9 Sheets-Sheet 9

Robert H. Damon
Clarence F. Rogier
John W. Baur
Thomas E. Kulo
INVENTORS.

BY Edmund W. C. Kamm
ATTORNEY

Patented July 1, 1941

2,247,480

UNITED STATES PATENT OFFICE 2,247,480

INVENTORY CONTROL SYSTEM AND APPARATUS

Robert H. Damon, Clarence F. Rogier, John W. Baur, and Thomas E. Kulo, Chicago, Ill., assignors to S. F. Bowser & Company, Incorporated, Fort Wayne, Ind., a corporation of Indiana Application November 6, 1939, Serial No. 303,036

19 Claims. (Cl. 194—66)

This invention relates to a liquid dispensing system which is designed to control and release for resale, an inventory of liquid stored in the system. More specifically, the invention relates to a system comprising the combination of a locked storage tank and a sealed delivery system which includes a dispensing apparatus, together with a token or check operated predetermined mechanism, in which system the token serves as a key to release, for resale from said system, a predetermined amount of liquid and serves also as the instrument for transferring possession and/or title of said predetermined amount of liquid to the reseller at an established wholesale price.

In the distribution of liquids, for example, the distribution of gasoline by wholesalers or refiners to retailers or other resale agencies, the cost of distribution is a very serious item of expense to the wholesaler. This distribution is at present made on order of the reseller and the amount of gasoline to be delivered to the reselling station is determined solely by the management of such station.

The size of the individual dump is severely reduced by the practice of "hand to mouth" buying which has become established in many industries, and consequently, the number of dumps required is increased with the result that the cost of delivery of gasoline by the wholesaler is exorbitantly high.

Another problem which arises under the present distribution methods is that of preventing the sale, under the wholesaler's brand or name, of products not produced by said wholesaler, which substituted products are commonly termed in the case of gasolines "bootleg gas." The liquid dispensing system is under the sole control of the reseller and the wholesaler is powerless to prevent such practices.

One solution for these problems is disclosed in the application of Robert Hosken Damon, Serial No. 285,627, and the invention disclosed in this application has as one of its objects the provision of a combination of elements forming a system which will enable the Damon method to be effectively carried out.

Another object of the invention is to provide a system and apparatus which will control the inventory of liquid at the resale station and which will protect both the wholesaler and the reseller against losses by fraud, and otherwise.

A further object of the invention is to provide a dispensing system which is sealed throughout.

Yet another object of the invention is to provide, as a part of the protection scheme, a system of locks which require the presence of both parties to a transaction before the locks can be opened.

Still another object of the invention is to provide a dispensing and predeterminer apparatus which will receive and accumulate a token or tokens representing a predetermined amount of liquid, and which will release such amount of liquid for resale.

Another object of the invention is to provide a predeterminer device which will terminate dispensing operation of the dispensing unit when the amount of liquid released by a token or tokens is exhausted.

A further object of the invention is to provide a token collecting and predeterminer unit which retains the token or tokens against removal by anyone until the delivery of the predetermined amount of liquid represented by a token is completed, whereupon a token or check is released and, in effect, collected. In other words, the machine, in effect, holds the token in escrow pending the completion of the transaction which was initiated by the reseller.

Another object of the invention is to provide a sealed storage and dispensing system which is under control of both the wholesaler and the reseller with the object of giving the wholesaler control of the product which enters the system. This enables the wholesaler to prevent the substitution of other products in the place of those being supplied by him and assures the reseller's customer that the product sold to him is in fact the product of the wholesaler indicated by the advertising used in conjunction with the system.

Still another object of the invention is to provide a liquid dispensing system usually applied to the ordinary gasoline service station which will be normally capable of intermittent delivery operation at the will of the reseller by manipulation of the controls provided on the liquid dispensing apparatus, but which is subject to ultimate control by a token, coin or check controlled predeterminer device.

Yet another object of the invention is to produce a liquid dispensing apparatus which is under the control of a predeterminer mechanism which can be preset to permit the delivery of one of several amounts of liquid from the dispensing apparatus, and which can be preset to permit the delivery of a different predetermined amount even though delivery of the initial predetermined amount has been partly accomplished.

A further object of the invention is to provide a predeterminer equipped liquid dispensing apparatus, for gasoline or the like, which may be preset by a service station operator to terminate a cycle of operation after the dispensing of a predetermined amount, and which may be adjusted by the operator to increase the length of the cycle after the cycle has been entered upon.

Another object of the invention is to provide a predeterminer equipped liquid dispensing apparatus which will retain a token or plurality of tokens in an inaccessible position and which will discharge said tokens to an accessible position when the liquid represented by said tokens has been dispensed.

Other objects will be apparent from the study of the specification and the drawings which are attached hereto and made a part hereof and in which.

General Organization

Figures 2, 3, 4, 20, 21:
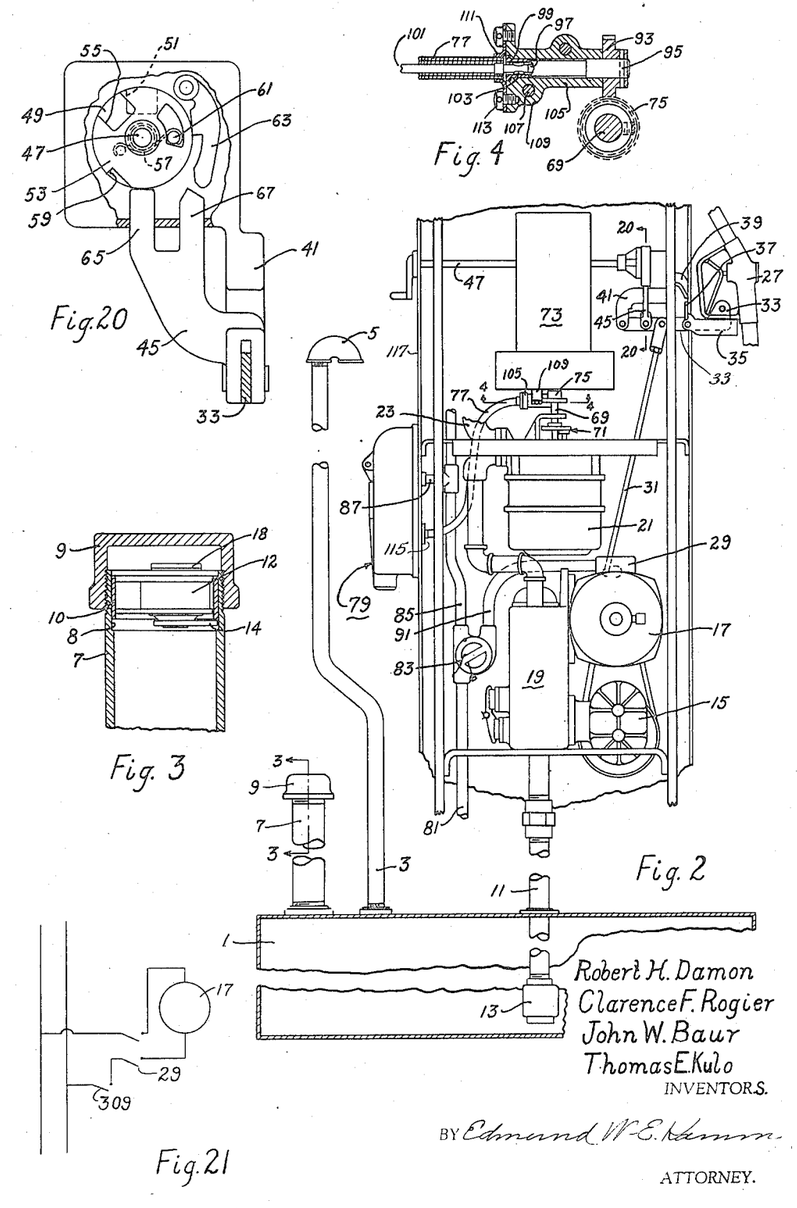
Figure 2 is an elevation with parts broken away showing the token controlled liquid dispensing system.
Figure 3 is a partial sectional view of the fill pipe and its closure.
Figure 4 is a partial sectional view showing the gear reduction and flexible shaft drive at the meter.
Figure 20 is a view taken on the line 20—20 of Figure 2 showing the interlock mechanism.
Figure 21 is a diagram of the electric wiring of the dispensing apparatus.

Referring to Figure 2, the numeral 1 indicates a storage tank which is usually disposed under ground and which is fitted at its top with a vent pipe 3. The latter rises above ground to a height usually regulated by law and is capped with a return bend 5 or other fitting which prevents entrance of rain, etc. This pipe usually extends upward beside a building and projects above the roof thereof.

Figures 1, 5, 6, 7:
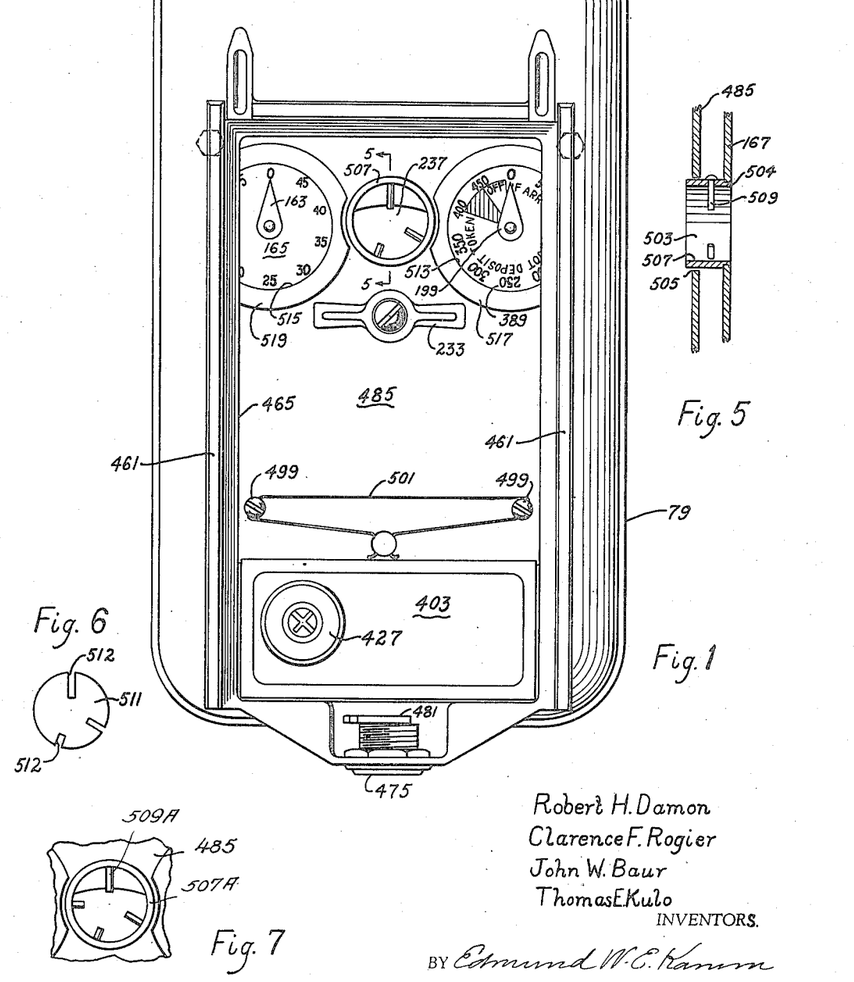
Figure 1 is an elevation of the token controlled predeterminer with the outer door removed.
Figure 5 is a section taken on the line 5—5 of Figure 1 showing the token selector mechanism.
Figure 6 is an elevation showing a token adapted to be received in the selector mechanism of Figures 1 and 5.
Figure 7 is an elevation showing a modified form of a selector mechanism.

A fill pipe 7 is also connected with the top of tank 1 and terminates at a point above the ground level or in a fill box which is set into the ground or into a driveway so that the upper surface of the box is flush with the surface of the ground or drive way. The fill box is usually provided with a plug to render it water tight, while the above ground pipe such as is shown in Figure 1 is usually fitted with a common pipe cap 9 to prevent the entrance of water, etc.

As shown in Figure 3, the pipe 7 is provided with a counter bore 8 into which is pressed a bushing 10. A plug 12 is fitted into the bore of the bushing and supported on the upper end thereof and carries a rotatable locking member 14 which rotates about an axis eccentric to the axis of the bushing, so that when the member occupies the position shown, it will engage the lower end of the bushing and lock the plug in place therein. A four-way lock 18 is fitted into the plug and controls the locking member. When the proper key is inserted and rotated, the locking member is rotated away from the position shown and will disengage the end of the bushing so that the plug may be withdrawn. However, the key can be withdrawn only when the locking member occupies the position shown.

The specific construction of the pipe closure is not the invention of applicants except as it forms an element of the combination forming the dispensing system. Complete details of the closure and the arrangement and construction of the various parts of the closure are found in the application filed by Harvey E. Marvel, Serial No. 302,961, filed concurrently herewith.

Referring again to Figure 2, a suction pipe 11 enters the tank 1 and is provided with a foot valve 13. The upper end of the pipe is connected through a screen chamber, not shown, to the suction chamber of pump 15. An air eliminator shown generally by 19 receives liquid from the discharge side of the pump, and liquid passes from the separator through a combined check and relief valve, not shown, to a meter 21 and thence by pipe 23 through the usual sight glasses and hose to a valve controlled nozzle 27.

A motor 17 which is controlled by a switch 29 drives the pump 15. A link 31 connects switch 29 for operation by a hose hook lever 33 which is pivoted to a bracket 41 which is fixed to the frame of the machine. A lever 35 carrying a projection 37 is pivoted on lever 33, and in the position shown, the projection is disposed close enough to a fixed abutment 39 so that the lever 33 cannot be fully raised until lever 35 is swung upwardly and counter-clockwise, and this latter motion is prevented so long as the nozzle is on the hook.

An interponent 45 is pivoted on the lever 33 and cooperates with an interlock mechanism shown in Figure 20. A reset shaft 47 extends through the register 73 and fixedly carries a disk 49 which is notched at 51 to receive a seeker 65 on 45. This seeker has an internal cam 67. A second disk 53 is rotatably mounted on shaft 47 and is provided with notch 55 adapted to receive seeker 65 and with notch 59 adapted to receive pawl 63. A pin 61 on disk 49 projects through 53 and a spring 57 holds the disks in the relative positions shown. The other end of the spring 57 is fastened to a pin 58 which is fixed in the disc 53 on the face adjacent the disc 49. In normal "switch-off" position the notches 51 and 55 are in the relative position shown in Fig. 20, except rotated 180 degrees.

As shaft 47 is rotated to reset the register before a dispensing operation, pawl 63 engages notch 59 and positions notch 55 above seeker 65. Further rotation of shaft 47 rotates disk 49 against the action of spring 57 to also position notch 51 above seeker 65, thereby aligning the notches. Lever 33 may then be raised whereupon the seeker enters aligned notches 51 and 55, and the link 31 turns on the switch to start motor 17, the pawl 63 is cammed out of notch 59 by the cam 67 when it moves upwardly with the seeker and disk 53 rotates a slight distance further under the action of spring 57 so that pawl 63 cannot reengage notch 59 when the lever 33 is again lowered to open the switch. When this latter event occurs, the disk 53 rotates under action of the spring to move notch 55 out of alignment with seeker 65 and the lever 33 cannot again be raised without again going through the resetting cycle as just described.

Referring to Figures 2 and 4, the meter 21 drives a shaft 69 by means of gearing 71 and the register 73, which may be a volume, cost or combined volume and cost register, is driven by said shaft.

A helical gear 75 (Fig. 4) is connected to be driven by shaft 69 and it, in turn, drives a helical gear 93 which is fixed to a shaft 95. The latter is provided with a bore 97 and broached to provide a pair of diametrically opposite keyways 99. A housing 105 is provided with a bore to receive the shaft 95. Bosses 109 are formed integrally with the housing and are perforated to receive bolts 107 which secure the housing to the register frame.

A flange plate 111 is fixed to the housing by fastenings 113 and is fixed as by a soldered joint to one end of a sheath 77 of a flexible shaft 101. The end of the shaft is adapted to be received in bore 97 and is provided with ears or keys 103 which are received in the keyways so that rotation of shaft 95 is imparted to the flexible shaft 101.

The flexible shaft 77, 101 is connected to drive a token operated predetermining mechanism shown generally by the numeral 79. Conduits and junction boxes 81, 83, 85, 87 and 91 connect the switch 29 and the predeterminer mechanism to the power line. While the device 79 is shown mounted on the housing of the dispensing apparatus it is, of course, within the scope of this invention to mount it in a different location, even one remote from the dispensing apparatus so long as the movement of the meter can be transmitted by the flexible shaft to the device. The conduit connections could, of course, be modified to meet the situation.

*The token operated predeterminer meter driven section*

Figure 8:
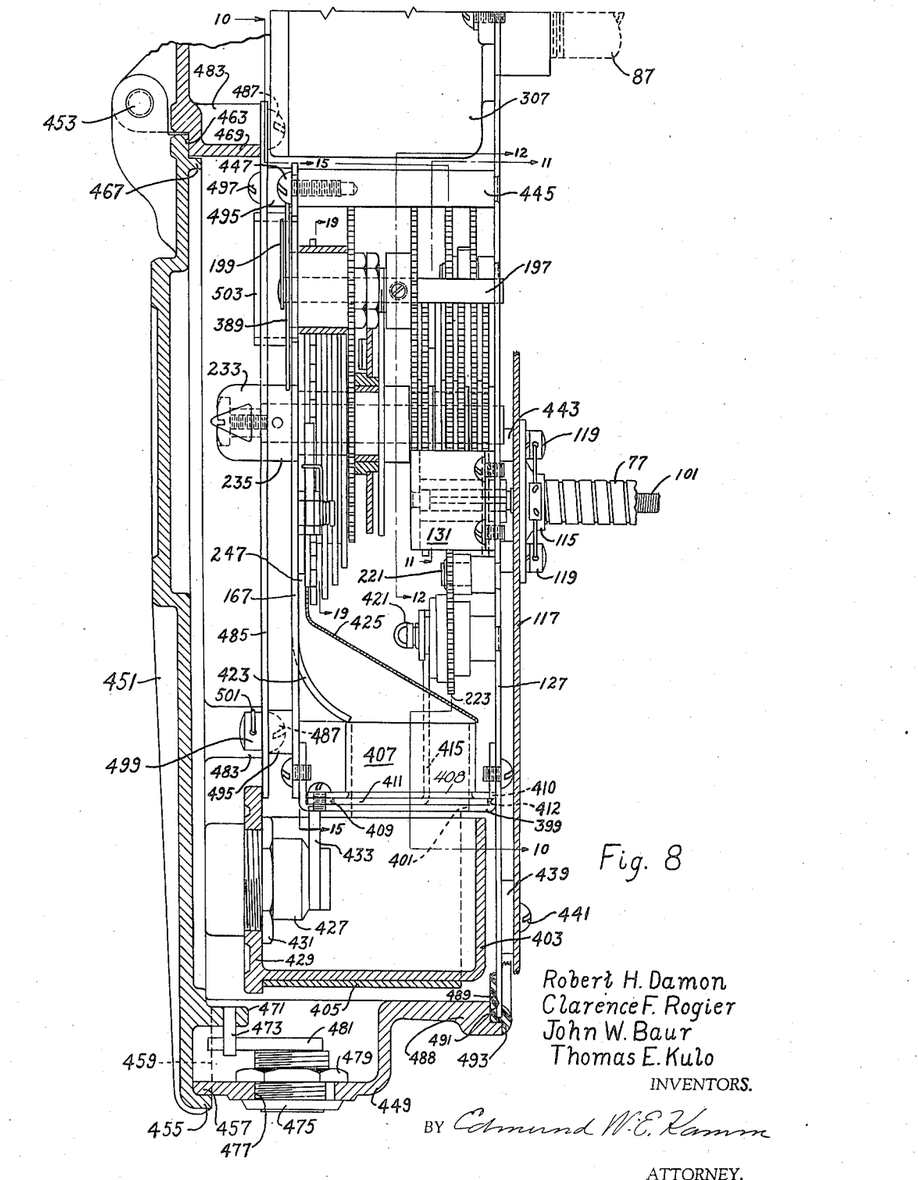
Figure 8 is an elevation with parts broken away of the token controlled predetermining device.

Referring to Figure 8, the casing 77 of the flexible shaft is fixed in a flanged collar 115 in any suitable manner, and the collar is attached to the dispenser housing 117 and to the casing 127 by means of seal screws 119. The drive cable 101 of said shaft is provided with keys which enter keyways 121 in the gear 123 (see Figure 9). The latter is provided with a shouldered recess 125 which is received in a back plate 127 of the predetermining mechanism. A pilot bearing 129 is supported on a bracket 131 which is suitably fixed to the back plate.

The gear reduction mechanism shown in Figure 4 is so designed that the gear 123 will be driven at a speed of one revolution per gallon of liquid dispensed by the meter 21.

Figure 9:
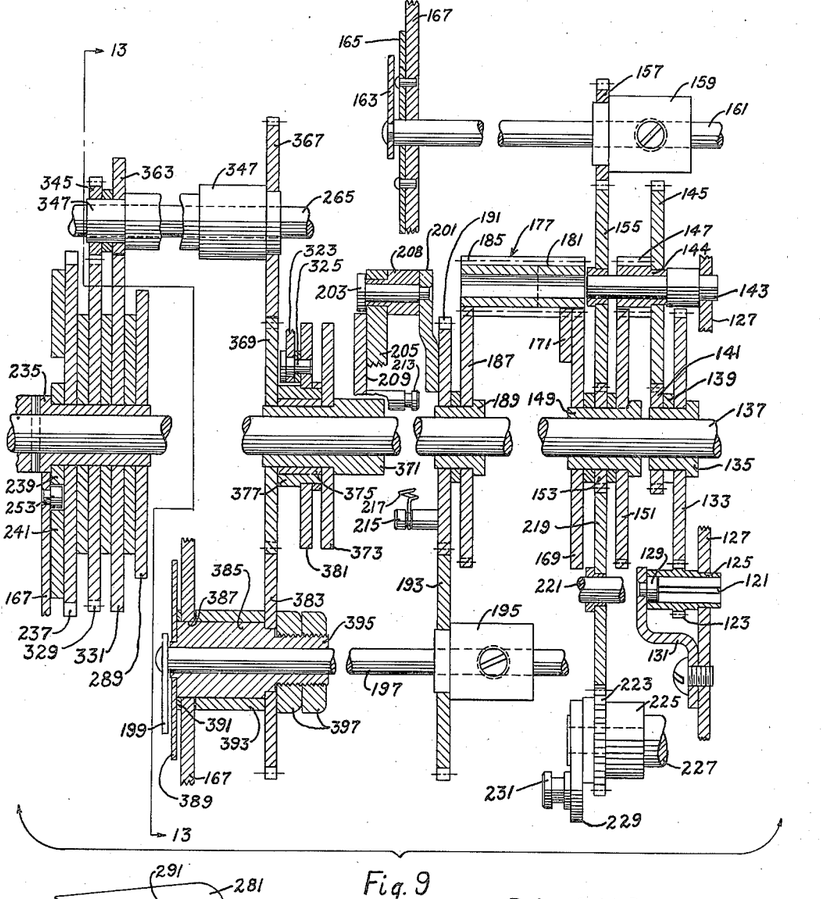
Figure 9 is an exploded top view of the gearing of Figure 8 with some of the shafts moved out of actual position and some distorted for clarity.
Figure 10:
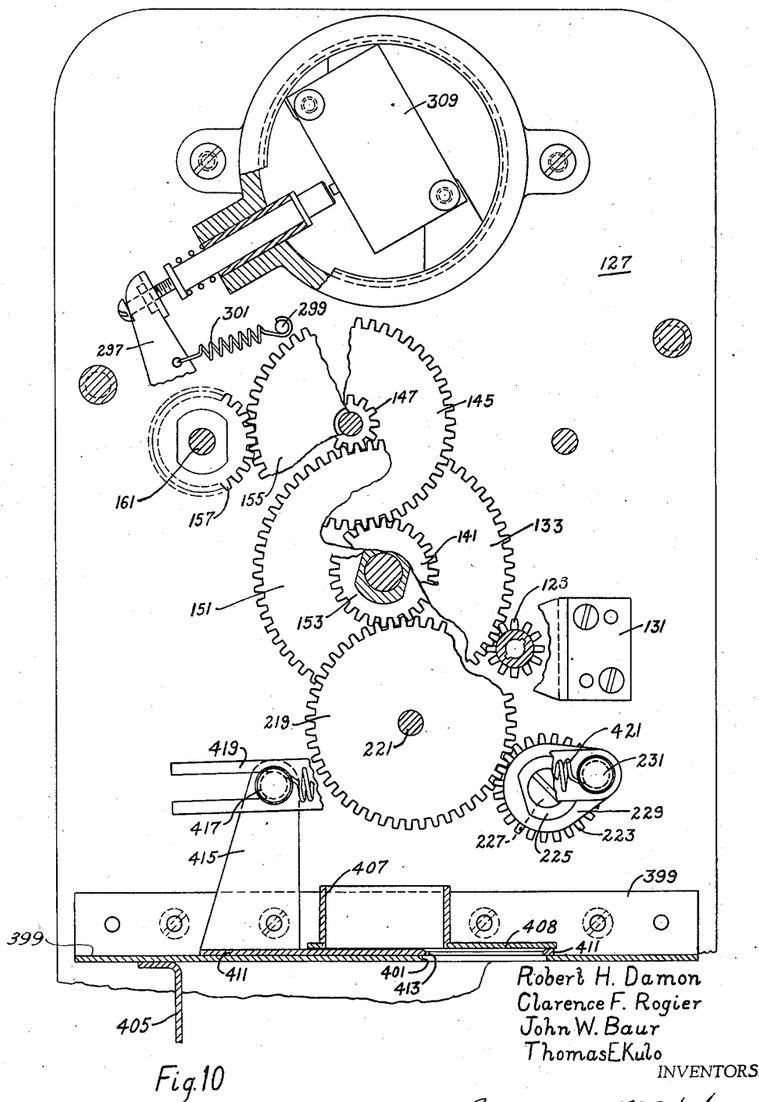
Figure 10 is a sectional view taken on the line 10—10 of Figure 8.
Figure 11:
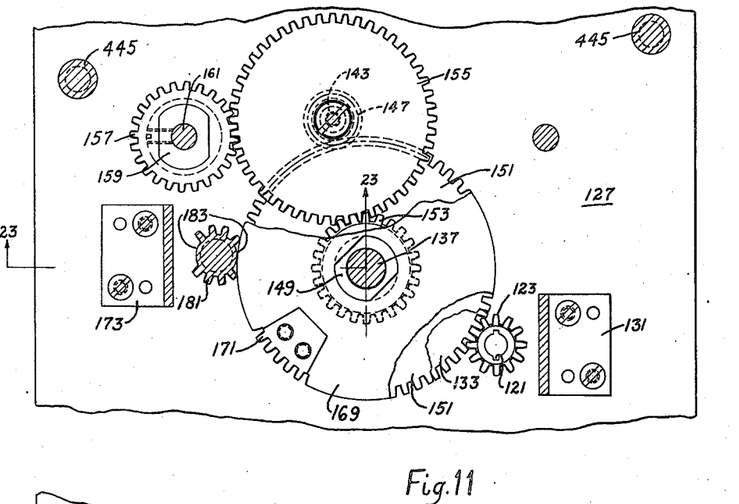
Figure 11 is a sectional view taken on the line 11—11 of Figure 8.

As shown in Figures 9, 10 and 11 the gear 123 has twelve teeth and is in mesh with a sixty-tooth gear 133 which is fixed to hub 135 which, in turn, rotates freely upon the shaft 137. A spacer 139 separates the gear 133 from a second gear 141 of twenty-four teeth fixed to the hub 135.

A stud 143 is fixed in the back plate 127 and has rotatable thereon a hub 144 which has fixed thereon a forty-eight-tooth gear 145, and a twelve-tooth pinion 147 is formed as a part of said hub.

A hub 149 is mounted for rotation on shaft 137 adjacent the hub 135 and has fixed thereto a sixty-tooth gear 151 which meshes with the pinion 147. A twenty-four-tooth pinion 153 is fixed to hub 149 and separated from gear 151 by a spacer. This pinion meshes with a forty-eight-tooth idler gear 155 which is mounted to rotate about the stud 143. The idler 155 meshes with a twenty-four-tooth gear 157 which is fixed to a hub 159. The hub is fixed to a shaft 161 which drives the fifty-gallon pointer 163 with respect to the fifty-gallon dial 165 which is fixed to the front plate 167. The hub 149 also carries a locking disk 169 which carries a five-tooth gear segment 171, as clearly shown in Figure 11.

Figure 12:
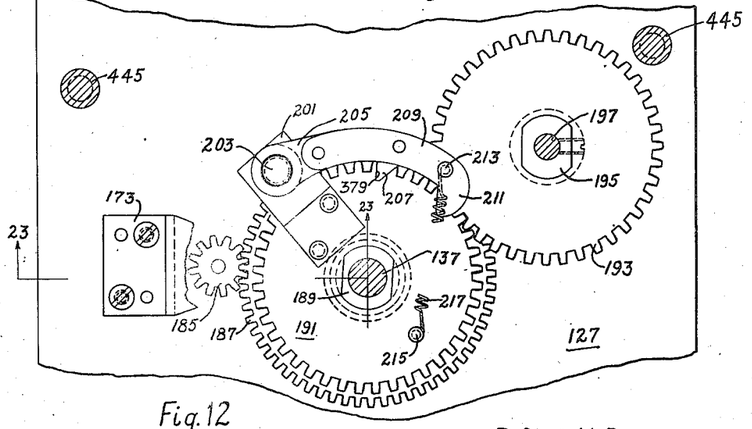
Figure 12 is a section taken on the line 12—12 of Figure 8.
Figure 23:
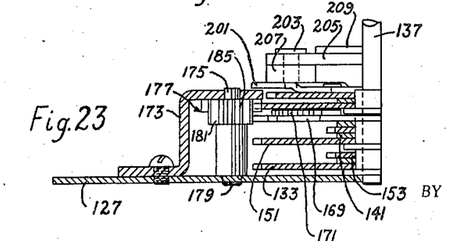
Figure 23 is a section taken on the line 23—23 of Figure 12.

A bracket 173 (Figure 23) is fixed to the back plate 127 and carries a bearing 175 which enters one end of a pinion indicated generally by 177. The other end of the pinion carries a projection 179 which enters the back plate 127. The portion 181 of the pinion, shown also in Figure 11, has eight teeth with diametrically opposite gaps 183 where two teeth have been cut away on each side. The end 185 of the pinion is a full twelve-tooth pinion as shown in Figures 12 and 23. The gaps 183 of the portion 181 of the pinion are normally in sliding engagement with the locking disk 169; however, when the gear segment 171 comes into position adjacent the pinion it will rotate the pinion through the distance of four teeth, whereupon the locking disk will slidably engage the other gap in the pinion. The upper portion of the pinion 185 is always in engagement with a sixty-tooth gear 187 which is fixed to a hub 189 which rotates loosely on the shaft 137. In Figure 9 the pinion 177 is shown longer than it actually is, and as shown comprises only the portions 183 and 185 thereof.

A forty-tooth gear 191 is spacedly mounted on the hub 189 and meshes with a forty-tooth gear 193 which is fixedly mounted on a hub 195 which is fixed to the shaft 197 supported in the front and back plates. A pointer 199 is fixed to the shaft 197 and rotates with respect to a dial later to be described. The gear 191 carries a bracket 201, and a stud 203 is fixed into the bracket 201 and carries a pawl 205 which is provided with a hub 208. The hub 208 is disposed between the pawl 205 and the bracket 201. The pawl 205 carries the cam follower 207. A second arm 209 is fixed to the pawl 205 and carries a star wheel engaging nose 211. A spring post 213 is fixed to the outer end of 209 and a second spring post 215 is fixed in the gear 191 and a spring 217 is suspended between the two posts and urges both arm 209 and pawl 205 in a clockwise direction about stud 203 as shown in Figure 11.

An idler gear 219 is mounted for rotation about a stud 221 mounted in the back plate 127 and is in mesh with the gear 153 and with a twenty-four tooth gear 223 which is mounted on a hub 225. The hub rotates on a stud 227 which is mounted on the back plate. A lever 229 which is adapted to actuate the coin ejector mechanism is mounted in fixed relation on the hub 225. The lever 229 carries a crank pin 231.

*Predeterminer presetting section*

The outer end of shaft 137 has fixed to it a thumb knob 233 as shown in Figures 1 and 8.

Figures 15, 16:
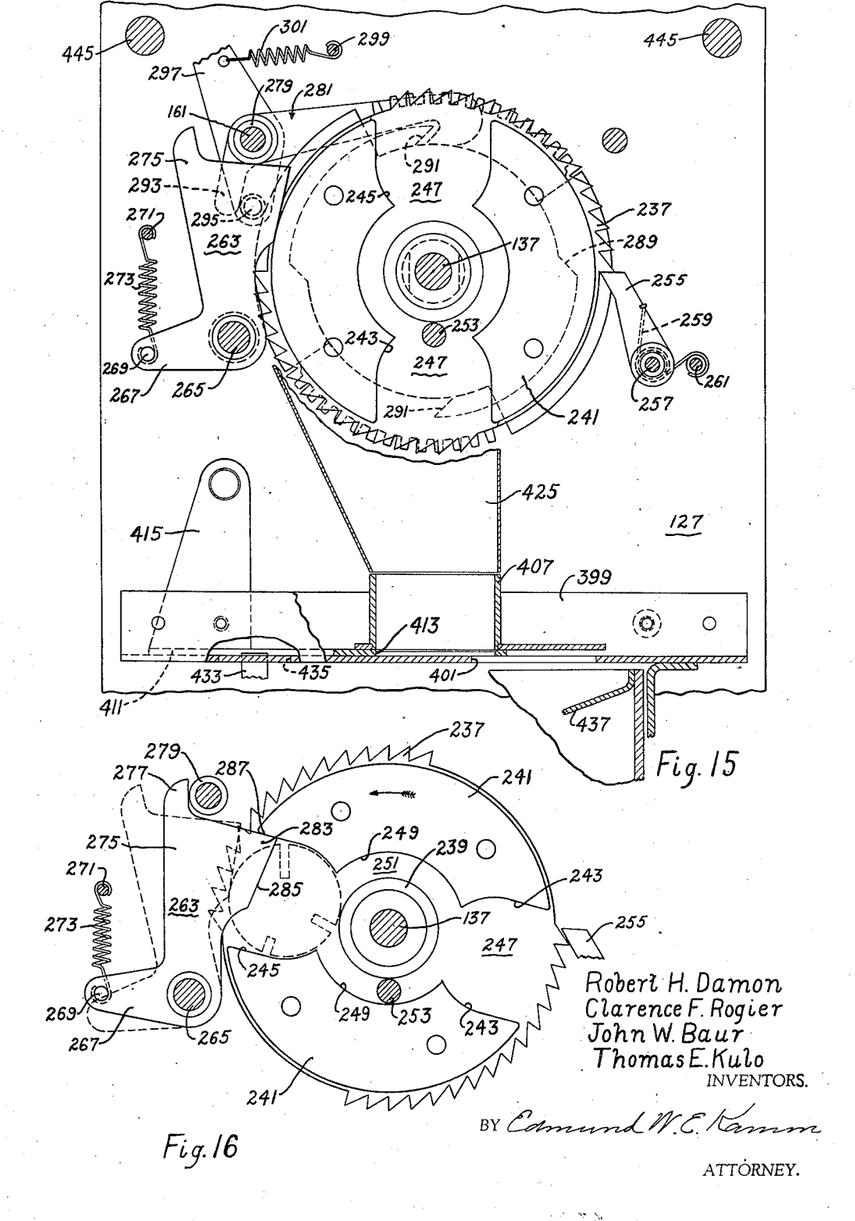
Figure 15 is a section taken on the line 15—15 of Figure 8.
Figure 16 is a view similar to Figure 15 showing the token carrying plate in its farthest idle position.

A hub 235 shown in Figures 8 and 9 is pinned to the shaft 137 and has fixed to it a non-return ratchet 237 which is provided with two diametrically opposed sets of teeth as shown in Figures 15 and 16. A spacer 239 is interposed between the hub 235 and the ratchet 237. Two plates 241 are fixed in diametrically opposite positions on the ratchet 237 and are cut away at 243 and 245 to form diametrically opposite token receiving recesses indicated generally by the numeral 247. The plates 241 are also cut away at 249 to form an annular passageway 251 between said plates and the spacer 239. A pin 253 is fixed in the front plate 167 and rides in the passageway 251 and serves to force any tokens which may be stuck in a recess 247 out of said recess.

A pawl 255 is pivotally mounted on a stud 257 which is fixed in the front plate and is urged counter-clockwise (see Figure 15) into engagement with the teeth of the ratchet 237 by means of a spring 259 which at one end engages the pawl and at the other engages a pin 261 fixed in the front plate.

A locking pawl 263 (Figures 15 and 16) is pivotally mounted on a shaft 265. The locking pawl is provided with an arm 267 which, in turn, is provided with a pin 269. A pin 271 is fixed in the front plate and a spring 273 is suspended between the pins 269 and 271. The spring tends to rotate the pawl in a clockwise direction about the shaft 265. The arm 275 of the pawl is provided with a projection 277 which is adapted to abut a hub 279 of a cam follower lever 281. The arm 275 is also provided with an abutment 283 and a follower surface 285.

The purpose of this mechanism is to prevent rotation of the thumb knob 233 to a point at which the full stroke pawl 255 will engage the full stroke ratchet 237 unless a token has been inserted in the recess 247. Should the knob be turned in the direction of the arrow in Figure 16 without the insertion of a token, the follower surface 285 will ride upon the outer periphery of the lower plate 241 until the recess 247 is reached, whereupon spring 273 will rotate the pawl clockwise until the projection 277 engages the stop 279. In this position of the pawl the abutment 283 will be in a position to engage the upper edge 287 of the recess 247 as shown in full lines in Figure 16. It will be noted that the full stroke pawl 255 is not yet in engagement with the teeth of the full stroke ratchet.

The pawl 263 is so designed and positioned as to permit a movement of the thumb knob through about 75½ degrees in moving the full stroke ratchet 237 from the position shown in Figure 15 to that shown in Figure 16. Accordingly, if the full stroke pawl is not to be engaged in the position shown in Figure 16 the teeth of the full stroke ratchet will have to be cut away for a distance slightly in excess of the 75½ degrees mentioned above.

In the event a token is inserted in the recess 247 before the thumb knob is turned, the follower surface 285 on pawl 263 will engage the periphery of the token and will be held in the position shown in dotted lines in Figure 16 so that the abutment 283 will not engage the edge of the recess 247. Consequently, the thumb knob and the shaft 137 may be turned far enough to engage the full stroke pawl and ratchet. Once this engagement has been effected the thumb knob and shaft 137 cannot be rotated in a clockwise direction until a complete presetting cycle has been effected.

Figure 13:
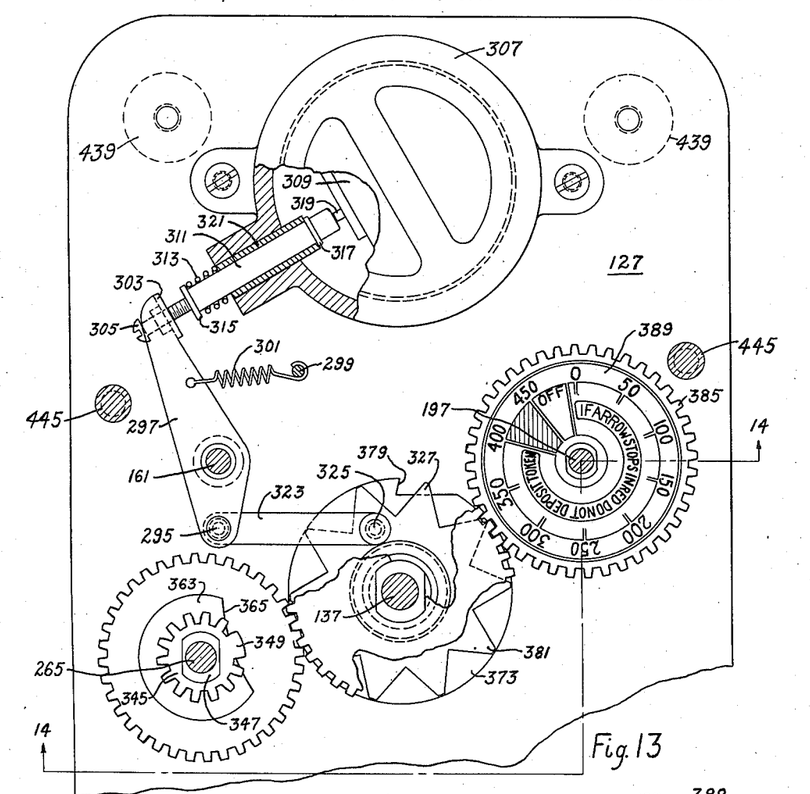
Figure 13 is a section taken on the line 13—13 of Figure 9.
Figure 22:
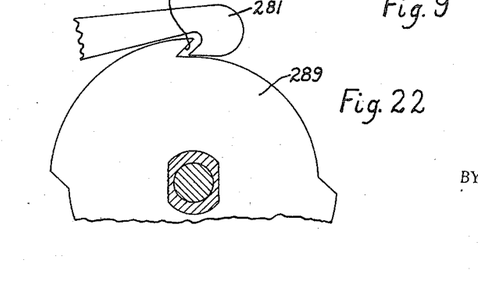
Figure 22 is an elevation showing the switch operating cam and pawl.

A switch operating cam 289 which is fixed to rotate with the hub 235 is disposed on the extreme right-hand end of said hub as seen in Figure 9. The cam is provided with two diametrically opposite notches 291 which may be undercut as shown in Figures 15 and 22 and are located at the center line which passes through the center of shaft 137 and the recesses 247. The cam is so designed that a land extends from each of said notches for a distance of 75½ degrees in a clockwise direction, as viewed in Figure 15, before a rise is encountered. From this point the cam rises to the full height of the notch more or less abruptly so that the switch will be opened after the full stroke mechanism is engaged but before the shut-off cam 373 is actuated far enough to close switch 309 (Fig. 13). Closing the switch 309 conditions the circuit for a dispensing operation on subsequent closing of switch 29.

The cam follower pawl 281 is positioned to ride on the cam 289 just described. It comprises a downwardly extending arm 293 which is adapted to engage a pin 295. The pin is fixed in a switch operating lever 297, shown fully in Figures 13, 17 and 18, which is pivotally mounted on the shaft 161. A pin 299 is mounted in the front plate and a spring 301 is suspended between said pin and a perforation in the lever 297. The spring tends to rotate the lever 297 in a clockwise direction (Figures 10, 13 and 15) and this motion is transmitted through the pin 295 and arm 293 to the lever 281 which is accordingly held in engagement with the cam 289.

The lever 297 is provided with a bent-over ear 303 which is perforated and threaded to receive an adjusting screw 305 which may be locked in place by a suitable lock nut.

A switch box 307 is mounted on the back plate 127 by means of suitable fastenings and a normally open switch 309 is mounted in the switch box. A push rod 311 is mounted to slide radially in and out of said switch box to operate the switch 309. A spring 313 encircles the outer end of said push rod and engages a flange 315 thereon. A snap ring 317 is mounted on the inner end of said push rod to prevent it from being drawn out through the switch box. The spring 313 normally retains the push rod out of engagement with the switch operating button 319. The push rod 311 is mounted in an oilless bushing 321 which is mounted in the switch box. The switch box 307 is explosion proof.

Pivotally mounted on the pin 295 is one end of a link 323, the other end of which is pivotally mounted on a pin 325 which is fixed in a star wheel 381 later to be described.

Figure 14:
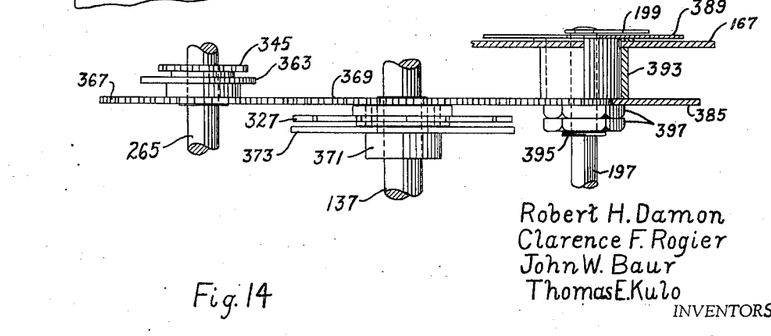
Figure 14 is a section taken on the line 14—14 of Figure 13.

Referring again to Figures 9, 13 and 14, separated from the full stroke ratchet 237 by a spacer is a segment gear 329, and separated from this by a spacer is a locking disk 331. The switch cam 289 heretofore described is separated from the locking disk 331 by another spacer. The elements 237, 329, 331 and 289 are all fixedly mounted on the hub 235. The segment gear 329 is mounted in a very definite relation upon the hub 235 and is provided with diametrically opposite sets of teeth 333 and 335 comprising thirteen teeth each. (See Figure 19.) The locking disc 331 comprises a right and left hand sector 353 and 357 respectively.

The center line of the right-hand tooth 337 of the set 333 is disposed 50 degrees from the vertical center line through the shaft 137. The center line of the left-hand tooth 339 of set 333 will be disposed 19 degrees and forty minutes to the left of the vertical center line through shaft 137. The right-hand tooth of the set 335 is diametrically opposite the tooth 339 and the left-hand tooth 343 is diametrically opposite the tooth 337. The teeth of gear 329 are adapted to engage the teeth of a gear 345 which is mounted on a hub 347 which is adapted to rotate on shaft 265. The gear 345 is provided with a double tooth 349, the center line of which is normally disposed at an angle along a line which is 18 degrees above the horizontal center line of the shaft 265 and is directed toward the shaft 137. The periphery of the sector gear 329 is cut away to clear the double tooth when it is in the position shown in Figure 19.

The locking disk 331 which is mounted on hub 235 (Fig. 9) is disposed in definite relation with respect to the segment gear 329. The leading edge 351 of the right-hand locking sector 353 (Fig. 19) is disposed at an angle of 56 degrees to the right of a vertical center line passing through the shaft 137. The trailing edge 355 of the left-hand locking sector 357 is disposed at an angle of 81 degrees 48 minutes counter-clockwise from the leading edge 351. The trailing edge 359 of the sector 353 is diametrically opposite the trailing edge 355 of sector 357, and the leading edge 361 of the sector 357 is diametrically opposite the leading edge 351 of the sector 353.

A small locking disk 363 is mounted on the hub 347 and is cut away at 365 to receive the peripheries of the sectors 353 and 357. The disk 363 is positioned on hub 347 so that when the double tooth 349 occupies the position described above, the cut-away portion 365 will be centered on a line joining the centers of shafts 265 and 137.

Figure 19:
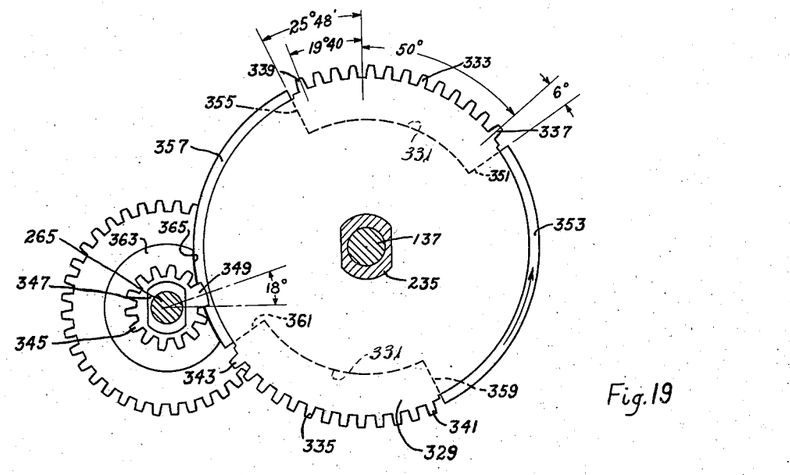
Figure 19 is a sectional view taken on the line 19—19 of Figure 8.

It will be apparent that in rotating the shaft 137 180 degrees, by means of the thumb knob 233, the locking segment 357 will pass out from under the cut-away portion 365 of the locking disk 363 and the first tooth 339 of the segment gear 333 will engage the double tooth 349 to rotate gear 345, hub 347 and the other parts attached to said hub. From the time of engagement of tooth 339 with tooth 349 until engagement of the leading edge 351 of the locking segment 353 with the recess 365 of locking disk 363, the gear 345 and the associated elements will have been rotated one complete revolution in a clockwise direction as seen in Figure 19.

Attached to the end of the hub 347 opposite the gear 345 is a thirty-six tooth gear 367 which is adapted to drive a forty-tooth gear 369. The latter gear 369 is fixed on one end of a hub 371 which is rotatably mounted on the shaft 137, while a shut-off cam 373 is mounted at the opposite end of said hub 371. A spacer 375 encircles the hub and lies between the elements 369 and 373. A second hub 377 rides freely upon the surface of the spacer 375, and the star wheel 381 heretofore described is fixed to rotate with said hub. The link 323 is, as was described above, pivotally mounted on the pin 325 carried by the star wheel 381.

The cam follower 207, which was described above as being a part of the arm 205, is disposed in the plane of the shut-off cam 373 as shown in Figures 9 and 12. The star wheel engaging nose 211 is positioned in the plane of the star wheel 381 so as to engage the teeth 327 thereof.

Figures 17, 18:
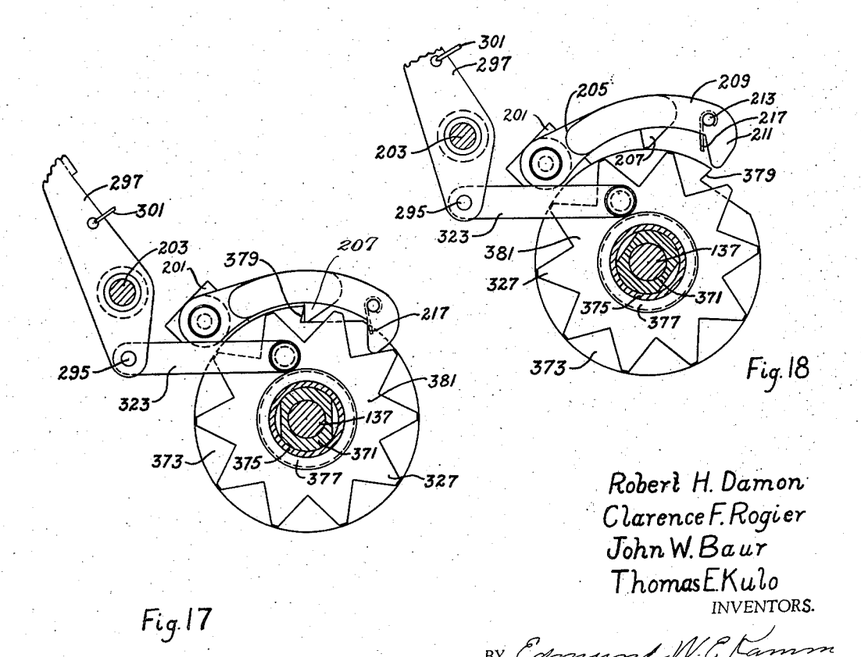
Figure 17 is an elevation showing a switch pawl in engaged relation with the star wheel and stop cam.
Figure 18 is a view similar to Figure 17 but showing the follower on the periphery of the shut-off cam.

In operation, as the follower 207 is pulled into a notch 379 in the cam 373 by the spring 217 the element 211 will engage the outer end of a tooth 327 on the star wheel, and since the spring 217 is more powerful than the spring 301 the star wheel 381 will be rotated clockwise as viewed in Figures 13 and 17. The link 323 will be pulled to the right and the switch lever 297 will be rotated in a counter-clockwise direction as viewed in Figures 13 and 17. The adjusting screw 305 will be pulled away from the tappet 311 so that spring 313 may withdraw the tappet from engagement with the switch operator 319 and permit the switch to open.

Referring again to Figure 9, a forty-tooth gear 383 is fixed to a hub 385 which is rotatably mounted upon shaft 197. The front end of the hub 385 bears in an opening 387 in the front frame 167 and a 500-gallon dial 389 (Figs. 1 and 13) is fixed to rotate with said hub. Part of the face of the dial is colored red as indicated, this being between the 400 and 450-gallon graduations. A spacer 391 may be interposed between the dial 389 and the frame 167 to prevent undue friction between the dial and the frame. A collar 393 may be interposed between the gear 383 and the frame 167 to hold the parts in desired position. The hub 385 is provided with a threaded extension 395 which extends through the gear 385 and receives lock nuts 397.

*Token ejector*

Referring to Figures 8, 10 and 15, an upwardly open channel shaped member 399 is fixedly secured between the front and back plates 167 and 127 and serves to space these plates. The member is provided with a downwardly directed opening 401 which is positioned above a token receiving box 403. The latter is supported in a downwardly depending U shaped element 405 which is fixedly secured to the element 399.

A cylindrical token receiving hopper 407 is mounted on a horizontal plate 408 which is spacedly mounted above the bottom portion of element 399 by means of projections 410 which enter perforations 412 on the right-hand upright of element 399 as shown in Figure 8, and by means of spacers 409 on the left-hand side of element 399 as shown in Figure 8. The hopper 407 is disposed laterally of the opening 401, as shown in Figure 10, but on the same transverse center line as shown in Figure 8.

An ejector slide 411 is disposed between the bottom portion of 399 and the plate 408 and is provided with an opening 413 adapted to receive a token. A lever 415 is bent upwardly from the plate 411 and carries a shouldered pin 417 which is adapted to be engaged on one side by a bifurcated link 419, the other end of which is pivotally mounted on the crank pin 231 heretofore described. A spring 421 is suspended between the pin 417 and the crank 231 and is adapted to retain the pin 417 against the closed end of the bifurcation in the link.

An ear 423 is bent inwardly from the front plate 167 and serves to deflect coins dropped from the recess 247 into the hopper. A shield 425 is mounted over the projection 423 and prevents the token from being deflected away from the hopper 407. As shown in Figure 15, the opening 413 in the slide 411 is in registration with the opening at the bottom of the hopper 407 when the slide occupies its maximum left-hand position.

As shown in Figure 10, the opening 413 is in alignment with the opening 401 in element 399 when the slide occupies its extreme right-hand position.

It will be seen that in the event a token becomes jammed so that the slide 411 cannot move to the right the spring 421 will be stressed, while at the same time, the crank 229 will be permitted to rotate. There can be no possibility of a jam when the slide 411 is moving to the left.

The token box 403 (Figures 1, 8 and 15) is provided with a four-way lock 427 which is held in place in the front plate 429 of the box by means of a nut 431. The bolt 433 is adapted to rotate and engage a slot 435 in the element 399 as shown in Figure 15. A deflector 437 is fixed to the right-hand end of the box 403 and serves to prevent the piling up of tokens under the opening 401.

Mounting of device and case

Referring to Figure 8, the numeral 117 represents the housing of the dispensing apparatus. The back plate 127 of the predeterminer device is provided with four bosses 439 which are adapted to receive screws 441 which are inserted from the inside of the housing. Bosses 443 are also formed on the back plate and are adapted to receive seal screws 119. The screws 441 and 119 serve to hold the predeterminer mechanism onto the dispensing apparatus housing.

The front and back plates 167—127 are spaced at their upper ends by spacer studs 445 which are fixed in the back plate and which receive screws 447.

The entire apparatus is enclosed in a casing 449 having a door 451 which is hinged to the casing at its upper end at 453. A transverse flange 455 (Figure 8) is adapted to overlap the lower edge 457 of the casing while vertical flanges 459 are adapted to overlap ribs 461 formed on the case. This interfitting flange arrangement serves to seal the lower and side edges of the door against the entrance of water, etc. The door fits over an opening 465 in the casing 449 (Fig. 1).

A transverse recess 463 is formed at the upper edge of the opening 465 to receive the upper edge of the door 451. An inwardly projecting rib 467 is formed on the door and underlies an inwardly projecting flange 469 on the casing (see Figure 8).

A lug 471 integral with the door extends inwardly of the casing and is provided with a downwardly extending pin 473. A lock 475 is inserted in an opening 477 in the lower side of the casing and is held in place by a nut 479. The lock is provided with a hook shaped bolt 481 which is adapted to engage the pin to prevent the door from being opened by unauthorized persons.

Four bosses 483 are formed on the case 449 and extend inwardly from the portion at the sides of the opening 465. A masking plate 485 is held in position on said bosses by screws 487 which are inserted from the rear of the case.

The rear portion 488 of the case is formed with a recess 489 adapted to receive a weather seal 491 and the back plate. The weather seal is provided with a rounded bead 493 which overlies both the back plate and the case and which is adapted to be compressed against the dispensing apparatus housing when the fastenings described below are drawn up.

Four bosses 495 are formed on the front plate 167, and the masking plate 485 is held in engagement with the bosses by upper screws 497 and lower screws 499. The latter are seal screws adapted to receive the seal wire 501.

A short tube 503 is fixed into the front plate 167 which is perforated at 504 as shown in Figure 5. The masking plate 485 is perforated at 505 to permit passage of the tube through it. The opening 507 in the tube is of sufficient diameter to receive a token.

Pins 509 are inserted radially through the tube 503 and fixed in place therein. The pins may be of any suitable length, may be of different lengths and may be spaced at different intervals about the inner surface of the tube. All of the pins are preferably disposed in the same plane. This structure is similar to that described and claimed in the patent to Ardiff, Number 1,995,493, issued March 26, 1935.

A token 511, shown in Figure 6, is provided with slots 512 and is adapted to be received by the selector mechanism shown in Figures 1 and 5. The selector will not receive tokens having slots which do not conform to the pins in length, thickness and spacing by preventing passage thereof into the recesses 247 shown in Figures 15 and 16.

Figure 7 shows a different number of pins inserted in the tube.

Openings 513, 515 are formed in the masking plate 485 in the region of the indicator dials 165 and 389, and frames 517, 519 support glass or other transparent material over the openings.

Operation-presetting

The operator will first unlock 475 (Figure 1) and raise the door 451 and observe the relation of dials 165 and 389 and their respective pointers to determine the number of gallons which the predetermining mechanism is set to deliver. This depends upon the number of tokens originally placed in the mechanism and upon the number of gallons of liquid taken out since. As shown in Figure 1 this gallonage is fifty and the switch 309 will be closed so that any amount up to fifty gallons can be delivered, the switch having been closed when the token was inserted, the knob 233 turned, and the shut-off cam 373 displaced from under the cam follower 207, as shown in Fig. 18. The apparatus illustrated will take up to nine tokens, representing 450 gallons.

Should the pointer 199 occupy the area colored red on the dial 389, no tokens should be inserted. A warning to this effect appears on the face of the dial, because insertion of another token would carry the predeterminer back to the "switch-off" position. Thus, the value of the nine previously inserted tokens would be lost. When the pointer stops in the red area, fluid can be dispensed, whereupon the pointer will be moved by the meter toward successively lower numerals as gasoline is dispensed.

If the thumb knob is rotated without the insertion of a token it will come to rest within a distance of 75½ degrees, with the parts in the position shown in full lines in Figure 16 in which the abutment 283 engages the corner 287. It is to be noted that the full stroke mechanism 255, 237 is not engaged in this position.

With the parts in the Figure 1 position, a token 511 which has slots 512 which conform with the arrangement of pins 509 in tube 503 will enter the tube and drop down to seat itself in recess 247 (Figures 15 and 16). As the thumb nut is now rotated counter-clockwsie, the pawl 263 will be cammed counter-clockwise by engagement of the token with surface 285 on the pawl, and the corner 287 will pass the abutment 283. The full stroke ratchet 237 will thereupon be engaged by the pawl 255 and the thumb knob cannot be returned to the token receiving position.

It should also be noted that the pawl 255 engages the last tooth on the upper sector of the full stroke ratchet to position the recess in alignment with the tube 507 as is clearly shown in Figure 15.

After the full stroke mechanism is engaged, a slight additional movement of shaft 137 will bring the cam 289 (Figures 15 and 22) to the position in which it will have raised its follower 281 to its maximum height. This will hold the switch actuating lever 297 in the switch off position.

Rotation of shaft 137, as described, will also rotate the segment gear 329 and engage the first tooth 339 thereof with the double tooth pinion 345 which has twelve regular teeth and one double tooth. The same rotation will also move the locking segment 357 out of engagement with the locking disk 363 on the same hub as gear 345 so that the latter is free to rotate.

Since the segment 333 has thirteen teeth and the gear 345 has in effect thirteen teeth, one passage of the segment 333 will rotate gear 345 one complete revolution, whereupon the locking segment 353 will engage the locking disk 363 and hold the shaft motionless.

This rotation of gear 345 is transmitted to thirty-six tooth gear 367 and thence to forty-tooth gear 369 so that the hub 371 and shut-off cam 373 will be rotated four-fifths of a turn in a counter-clockwise direction (Figures 13, 17 and 18). This rotation of the cam positions the notch 379 36 degrees to the right of the position of Figure 17 as shown in Figure 18.

The above described rotation of cam 373 serves also to cam the follower 207 out of the notch 379 so that it will ride on the periphery of the cam. The element 211 will be withdrawn from the star wheel because levers 205 and 209 are fixed together side by side. The former carries the latter. The star wheel 381 does not move because it is held in position by switch lever 297 which in turn is latched by lever 281.

A forty-tooth gear 383 which is connected to the indicator dial 389 will be rotated in a clockwise direction (Figures 1 and 13) nine-tenths of a revolution and will come to rest with the pointer 199 indicating 0.

As rotation of shaft 137 continues, the token will be cammed out of recess 247 by its engagement with the pin 253 and the token will drop onto ear 423 (Figure 8) and be deflected into the hopper 407. The deflector 425 prevents the token from bouncing out of the hopper or away from the ear 423.

At the same time, as the cam 289 passes the position shown in Figure 15, the follower 281 will drop into notch 291 and spring 301 will move switch arm 297 clockwise to force push rod 311 into the switch box and close switch 309.

Likewise, the full stroke ratchet 237 moves out of engagement with pawl 255 which now becomes a limit stop for aligning the tube 503 and recess 247 as indicated above.

A number of tokens up to nine may be inserted in succession, and after each token is inserted the thumb knob and associated parts must be actuated through the cycle described above. At each operation the notch 379 in cam 373 will be positioned an additional 36 degrees clockwise away from the pawl 207, and the dial 389 will be moved correspondingly in a counterclockwise direction.

Should it be attempted to insert a token at a time while the motor is running the above described cycle will be gone through with the modification that the cam 289 and lever 281 will be effective to open switch 309, which in the previous description was already in the open condition.

It should also be mentioned that the reason for timing the cam 289 and lever 281 to be effective to cut off the switch 309 only after the full stroke ratchet and pawl are engaged is that, if the switch could be opened and closed at will by manipulating the thumb knob and without the insertion of the token, the motor could be started and stopped without going through the resetting cycle of the mechanism disclosed in Figure 20, and consequently, this mechanism would be of no practical use.

The switch 309 must be opened before the cam 373 is moved far enough to cam up its follower to close switch 309 and must be kept open until the shut-off cam 373 has been completely actuated so as to prevent an improper presetting of said cam.

*Operation—predetermining*

Since the gear 123 is rotated at a speed of one revolution for every gallon of liquid dispensed by the meter, and since the cam follower 207 (Figures 12, 17 and 18) is to move only one-tenth of a revolution for every fifty gallons, it is apparent that a 500 to 1 reduction in speed must be accomplished between these points. This is accomplished by making gear 123 a twelve-tooth gear, setting up the following train of gears:

| Gear No. | No. teeth | Total reduction |
| --- | --- | --- |
| 123 | 12 | |
| 133 | 60 | 5 to 1. |
| 141 | 24 | |
| 145 | 48 | 10 to 1. |
| 147 | 12 | |
| 151 | 60 | 50 to 1. |
| 171 | 5=1 | |
| 181 | 8=2 | 100 to 1 step tooth. |
| 185 | 12 | |
| 187 | 60 | 500 to 1. |
| 191 | 40 | Carries follower 207. |

In addition, the gear 153 is driven from the same hub as gear 151, so that the reduction to the shaft 161 carrying the indicator 163 which cooperates with the 50-gallon dial 165 is as follows:

| | | |
| --- | --- | --- |
| 151 | 60 | 50 to 1 |
| 153 | 24 | 50 to 1 |
| 155 | 48 | 100 to 1 (idler) |
| 157 | 24 | 50 to 1 |

Thus for each fifty revolutions of gear 123 pointer 163 makes one revolution.

The shaft 197 which carries pointer 199 which cooperates with the 500-gallon dial 389 is driven from forty-tooth gear 191 by a forty-tooth gear 193 so that it makes one revolution in every five hundred revolutions of gear 121.

The gear 153 which has twenty-four teeth drives gear 223 which has twenty-four teeth through an idler gear 219, and consequently, the crank 229 makes one revolution for every fifty revolutions of gear 121.

To operate the dispensing apparatus the operator must operate the reset shaft 47 to reset the registering mechanism 73 to zero. This, as previously explained, frees the lever 33 for manual upward operation to close the switch 29, and the motor 17 and pump 15 are set into operation so that liquid may be dispensed from the nozzle 27. Upon completing a dispensing operation, the lever 33 will be drawn down to the Figure 1 position and the nozzle will be hung up on the lever. This completes a dispensing cycle of the apparatus.

As liquid is dispensed, the meter drives the flexible shaft by means of the gearing 75, 93, etc., and the gear 123 is advanced one revolution for every gallon dispensed. At the same time, the pointer 163 is continually advanced in a clockwise direction with respect to dial 165, as viewed in Figure 1, to indicate the portion of a 50-gallon unit which remains to be dispensed.

Similarly, the pointer 199 is advanced one-tenth of a revolution for each revolution of the pointer 163. The transfer which is effected by the step tooth gear 171 and gear 181 is timed to occur when the pointer 163 passes from the zero to about the 48-gallon mark. Thus the sum of the readings on the dials will always represent the total number of gallons for which the predetermining mechanism is preset.

The indicators as shown in Figure 1 indicate that one token has been inserted and that the machine is preset for fifty gallons.

If desired, the pointer 199 may be set just slightly to the right of the zero mark to indicate that the reading is fifty instead of zero. This may be done by loosening the set screw in hub 195 (Figure 9) and rotating the pointer to the desired degree.

As liquid is dispensed the cam follower 207 is advanced in a clockwise direction as shown in Figures 1, 17 and 18. It will advance one revolution for every five hundred revolutions of gear 123 and hence once in every 500 gallons. If, during dispensing, the liquid delivered equals the preset amount, the follower will come into registration with the notch 379 in the cam and the spring 217 (Figure 11) will draw the follower into the notch.

The relation between the cam follower 207 and the notch in the shut-off cam, and between the step tooth gear 171 and the mutilated gear 181, is preferably such that the follower 207 will drop into the notch on the shut-off cam shortly before the last tooth on the step tooth gear 171 completes the passage of the associated said set of teeth on the gear 181. Accordingly, a slight additional movement of the step tooth gear 171 will bring the locking disk 169 into locking relation with the gear 181.

Since the lever 209 is connected with lever 205, and since spring 217 is stronger than the spring 301 on the switch operating lever 297, the point 211 (Figures 12, 17 and 18) will be drawn down into engagement with a tooth 327 of the star wheel 381 and will rotate it clockwise on the hub 377.

This movement of the star wheel is transmitted by link 323 to the lower end of lever 297 and will rotate the lever in a counter-clockwise direction about the pivot 203. Such rotation will free the plunger 311 (Figure 13) which will be withdrawn from switch box 307 by means of spring 313 and the switch 309 will accordingly be opened to stop the motor 17.

The circuit diagram shown in Figure 21 shows how the switch controls the motor. The switch 309 is a single pole switch and is preferably inserted in the "hot" side of the line.

The coin ejector lever 229 is timed with relation to the 50-gallon pointer 163 so that the token will be ejected from hopper 407 into the token box 403 at the time the pointer approaches the zero position on the 50-gallon dial. Thus the tokens are retained in a position where they are not accessible by either the person who inserted them into the machine or by a collector who has access to the token receiver until substantially the entire amount of liquid represented by the token has been dispensed.

It should be noted that the lock 427 on the token receiver and the lock 18 in the fill pipe plug are both "four-way" locks. These are preferably matched so as to be opened by the same key, and if desired, this key can be made in two interfitting parts so that the presence of the holders of both parts is required in order to open either of the locks.

It is to be understood that the predetermining device need not of necessity be mounted on the housing of the dispensing apparatus. The flexible shaft may be extended to any suitable point and the wiring connections to switch 309 may also be extended to such a point. Thus a remote control unit is within the scope of this application.

It is apparent that applicants have provided a system and apparatus which enables an owner of an inventory of liquids to distribute these liquids to a number of tanks which may be widely separated, which may be located on premises owned by others and which tanks may be owned by others, and yet the entire inventory is under full and accurate control of the original owner of the liquid.

At the same time, the transfer of title is accomplished by a sale of a token. The transfer of possession of the amount of liquid, the title to which is thus transferred, is easily accomplished by the insertion of the token in the predeterminer which releases that amount of liquid from the inventory for distribution at will by the purchaser of said liquid.

The system also gives control of the different liquids which may comprise the inventory by providing means for selecting the particular tokens which will serve to permit operation of the dispensing unit. In other words, one form of token selector may be used on the "Ethyl" grade, in the case of gasolines, while a different selector is used on the "Regular" and "Low grade" gasolines.

Similar selectors may be used on all of the dispensers in a group handling the same grade of gasoline for the same wholesaler throughout a particular area. The area or group may be determined either by the range of operations of the wholesaler or by wholesale prices or by other considerations. This selection of tokens is necessary to prevent irregular traffic in the tokens after they have been sold by the wholesaler.

In addition, the tokens may be provided with a code number which may be used to indicate the wholesaler who has issued the tokens and only tokens having a particular code number will be honored in a particular machine or group of machines.

It is, of course, very desirable that the tank be locked and that the dispensing line and openings in any apparatus connected in the line ahead of the meter be sealed to insure that no liquid is removed before it has passed through the meter, or if liquid is removed, evidence of such removal will be left.

The token itself may be formed with a signature of the owner of the inventory thereon so that any attempt to duplicate the token will be punishable under Federal counterfeiting laws.

The token may represent gallons or other units of liquid as described above or it may represent a predetermined money value of liquid. The device may be designed to use coins instead of tokens if desired.

It is intended that the term "liquid dispensing apparatus" be not limited to the usual filling station pump but should be considered sufficiently broad to include a metering system or apparatus for use in handling any type of fluid, whether liquid or otherwise.

It is apparent that various changes may be made in the size, form, construction and arrangement of parts without departing from the spirit of the invention; and accordingly, applicants do not desire to be limited to the specific forms herein described by way of illustration, but instead, desire protection falling reasonably within the scope of the appended claims.

What we claim to be new and desire to protect by Letters Patent of the United States is:

1. An apparatus for dispensing liquid comprising a receptacle containing said liquid, a conduit communicating with said receptacle, a dispensing nozzle at the end of the conduit, means to produce a flow of said liquid through said conduit, a device movable from an inoperative to an operative position for controlling the energization of said means, a meter driven by liquid flowing through said conduit, mechanism driven by said meter for moving said device to inoperative position, check controlled means for moving said device to operative position and manually operable dispensing control means released by dispensing movement of the nozzle and connected with said flow producing means for rendering said liquid flow producing means effective and ineffective at will when said device is in operative position.

2. In an apparatus for dispensing liquid, means to produce a flow of said liquid, manually operated means for regulating the liquid flow, a device movable from an inoperative to an operative position for controlling the energization of said flow producing means, a meter driven by the liquid flow, mechanism driven by said meter for moving said device to inoperative position, token controlled means for moving said device to operative position and additional manually controlled means co-operating with said device for rendering said flow producing means effective and ineffective at will when said device is in operative position, said additional manually controlled means operative only when the said flow regulating means is in operative position.

3. An apparatus for dispensing liquid comprising a receptacle containing said liquid, a conduit communicating with said receptacle, means to produce a flow of said liquid through said conduit, a device movable from an inoperative to an operative position for controlling the energization of said means, a meter driven by liquid flowing through said conduit, mechanism driven by said meter for moving said device toward inoperative position as a predetermined amount of liquid is being dispensed, means for moving said device to operative position, shut-off means for preventing said operative movement, check controlled means for releasing said shut-off means, and manually controlled means co-operating with said device for rendering said flow producing means effective and ineffective at will when said device is in operative position.

4. An apparatus for dispensing liquid comprising a locked receptacle containing said liquid, a conduit communicating with said receptacle, means to produce a flow of said liquid through said conduit, a device movable from an inoperative to an operative position for controlling the flow producing means, a meter driven by liquid flowing through said conduit, mechanism driven by said meter for moving said device to inoperative position, check controlled means for moving said device to operative position, said check controlled means being capable of receiving and holding a plurality of checks, means associated with said check controlled means and operated by the meter for individually releasing a check upon the passage of a predetermined amount of liquid through the meter, and manually controlled means co-operating with said device for rendering said flow producing means effective and ineffective at will when said device is in operative position.

5. An apparatus for dispensing liquid comprising a receptacle containing said liquid, a conduit communicating with said receptacle, means to produce a flow of said liquid through said conduit, an electric switch movable from open to closed position for supplying energy to said means, means to control the switch, a meter driven by liquid flowing through said conduit, mechanism driven by said meter to operate said control means to open the switch, check controlled means operating in conjunction with the switch control means for moving said switch to closed position, manually controlled means co-operating with said switch for rendering said flow producing means effective and ineffective at will when said switch is in closed position.

6. An apparatus for dispensing liquid comprising a receptacle containing said liquid, a conduit communicating with said receptacle, means to produce a flow of said liquid through said conduit, an electric switch movable from open to closed position for supplying energy to said means, means to control the switch, a meter driven by liquid flowing through said conduit, stop mechanism driven by said meter to operate said control means to open the switch, a power means controlled by said stop mechanism for moving said switch to open position, check controlled means operating in conjunction with the switch control means for moving said switch to closed position and manually controlled means co-operating with said switch for rendering said flow producing means effective and ineffective at will when said switch is in closed position.

7. An apparatus for dispensing liquid comprising a receptacle containing said liquid, a conduit communicating with said receptacle, means to produce a flow of said liquid through said conduit, a device movable from an inoperative to an operative position for controlling the energization of said means, a meter driven by liquid flowing through said conduit, mechanism driven by the meter to operate said control means to stop the flow, a credit posting element movable to any one of a number of stop positions, check controlled means for moving said device to operative position and also moving the credit posting element, and manually controlled means co-operating with said device for rendering said flow producing means effective and ineffective at will when said device is in operative position.

8. An apparatus for dispensing liquid comprising a receptacle containing said liquid, a conduit communicating with said receptacle, means to produce a flow of said liquid through said conduit, a device movable from an inoperative to an operative position for controlling the energization of said means, a meter driven by liquid flowing through said conduit, mechanism driven by the meter to operate said control means to stop the flow, a credit posting element movable to any one of a number of stop positions, check controlled means for moving said device to operative position and also moving the credit posting element, manually controlled means co-operating with said device for rendering said first named means effective and ineffective at will when said device is in operative position, and an auxiliary shut-off means operable during part of the credit posting movement for moving said device to inoperative position.

9. An apparatus for dispensing liquid comprising a receptacle containing said liquid, a conduit communicating with said receptacle, means to produce a flow of said liquid through said conduit, a device movable from an inoperative to an operative position for controlling the energization of said means, a meter driven by a liquid flowing through said conduit, stop and stored power mechanisms for moving said device to inoperative position, said stop mechanism including a credit posting element movable to any one of a number of stop positions, said stored power mechanism being driven by the meter toward the stop position during liquid flow, check controlled means for moving said device to operative position and also moving the credit posting element, manually controlled means co-operating with said device for rendering said first named means effective and ineffective at will when said device is in operative position, and an auxiliary shut-off means operable at the beginning of the credit posting movement for moving said device to inoperative position, the device remaining in such inoperative position until completion of the credit posting movement.

10. An apparatus for dispensing liquid comprising a receptacle containing said liquid, a conduit communicating with said receptacle, means to produce a flow of said liquid through said conduit, a device movable from an inoperative to an operative position for controlling the energization of said means, means to regulate the flow, a meter driven by liquid flowing through said conduit, a resettable register driven by the meter, mechanism driven by the meter to operate said control means to stop the flow, a credit posting element movable to any one of a number of stop positions, check controlled means for moving said device to operative position, manually controlled means co-operating with said device for rendering said flow producing means effective and ineffective at will when said device is in operative position, an interlocking apparatus adapted to prevent operation of said manually controlled means to start the flow until said register has been reset, an auxiliary shut-off means for moving said device to inoperative position, and full stroke means associated with the credit posting element and arranged to become effective before the auxiliary shut-off moves said device.

11. In an apparatus for dispensing liquid, a pump to produce a flow of said liquid, a device movable from an inoperative to an operative position for controlling said flow, a meter driven by the liquid flow, mechanism driven by the meter for moving said device to inoperative position, check controlled means for moving said device to operative position, and manually operable dispensing control means connected with said pump for rendering said pump repeatedly operative and inoperative at will when said device is in operative position.

12. An apparatus for dispensing liquid comprising a receptacle containing said liquid, a conduit communicating with said receptacle, means to produce a flow of said liquid through said conduit, a device movable from an inoperative to an operative position for controlling the flow, a meter driven by liquid flowing through said conduit, a resettable register driven by the meter, mechanism driven by the meter to operate said control means to stop the flow, said mechanism including a credit posting element movable to any one of a number of stop positions, check controlled means for moving said device to operative position, manually controlled means connected with said device for rendering said flow producing means effective and ineffective at will when said device is in operative position, an interlocking apparatus adapted to prevent operation of said manually controlled means to start the flow until said register has been reset, an auxiliary shut-off means for moving said device to inoperative position, and full stroke means associated with the credit posting element and arranged to become effective before the auxiliary shut-off moves said device and to remain effective until the credit posting movement has been completed, said auxiliary shut-off holding said device in inoperative position in the meantime.

13. In an apparatus for dispensing liquid, means to produce a flow of said liquid, a device movable from an inoperative to an operative position for controlling the energization of said means, a meter driven by liquid flow, mechanism driven by the meter to operate said control means to stop the flow, a credit posting element movable to any one of a number of stop positions, check controlled means for moving said device to operative position and also moving the credit posting element, and manually controlled means connected with said device for rendering said first named means effective and ineffective at will when said device is in operative position, the credit posting element being operable at will by the check controlled means to set up further credits and postpone the automatic operation of the stop mechanism.

14. An apparatus for dispensing liquid comprising a locked receptacle containing said liquid, a conduit communicating with said receptacle, means to produce a flow of said liquid through said conduit, a device movable from an inoperative to an operative position for controlling the energization of said means, a meter driven by liquid flowing through said conduit, mechanism driven by said meter for moving said device to inoperative position, check controlled means for moving said device to operative position, said check controlled means being capable of receiving and holding a plurality of checks, means associated with said check controlled means and operated by the meter for individually releasing a check upon the passage of a predetermined amount of liquid through the meter, manually controlled means connected with said device for rendering said first named means effective and ineffective at will when said device is in operative position, and a locked receptacle for receiving the individually released checks, the locks on the storage receptacle and the check receptacle being the same.

15. In an apparatus for dispensing liquid, means to produce a flow of said liquid, a device movable from an inoperative to an operative position for energizing said means, a meter driven by liquid flow, mechanism driven by said meter for moving said device to inoperative position, and check controlled means for moving said device to operative position, said means including a sector gear, a locking sector associated therewith, a credit posting cam, and means connecting the cam, gear and locking sector for advancing said cam a predetermined distance for credit posting purposes and thereupon locking the same.

16. An apparatus for dispensing liquid comprising a receptacle containing said liquid, a conduit communicating with said receptacle, means to produce a flow of said liquid through said conduit, a device movable from an inoperative to an operative position for controlling the energization of said means, a meter driven by liquid flowing through said conduit, mechanism driven by said meter for moving said device to inoperative position, check controlled means for moving said device to operative position, manually controlled means connected with said device for rendering said first named means effective and ineffective at will when said device is in operative position, and means connected to the check controlled means for indicating the number of unexpended checks in the apparatus and also indicating when the apparatus is full of unexpended checks.

17. In an apparatus for dispensing liquid, means to produce a flow of said liquid, a device movable from an inoperative to an operative position for controlling the energization of said means, a meter driven by liquid flow, mechanism driven by said meter for moving said device to inoperative position, check controlled means for moving said device to operative position, an indicator connected to be advanced a predetermined distance for each operation of the check controlled means and a pointer driven by the meter and movable over the indicator to reduce the reading on the indicator.

18. In an apparatus for dispensing liquid, means to produce a flow of said liquid, a device movable from an inoperative to an operative position for controlling the energization of said means, a meter driven by liquid flow, mechanism driven by said meter for moving said device to inoperative position, check controlled means for moving said device to operative position, an indicator connected to be advanced a predetermined distance for each operation of the check controlled means and a pointer driven by the meter and movable over the indicator to reduce the reading on the indicator, said pointer being driven intermittently, another pointer continuously driven by the meter and a fixed indicator for the last named pointer.

19. An apparatus for dispensing liquid comprising a receptacle containing said liquid, a conduit communicating with said receptacle, means to produce a flow of said liquid through said conduit, a device movable from an inoperative to an operative position for controlling the flow, a meter driven by liquid flowing through said conduit, a resettable register driven by the meter, mechanism driven by said meter to operate said control device to stop the flow, check controlled means for moving said device to operative position, manually controlled means connected with said device for rendering said flow producing means effective and ineffective at will when said device is in operative position, and an interlocking apparatus adapted to prevent operation of said manually controlled means to start the flow until the register has been reset.

ROBERT H. DAMON.
CLARENCE F. ROGIER.
JOHN W. BAUR.
THOMAS E. KULO.